United States Patent
Knoll et al.

[11] Patent Number: 5,749,601
[45] Date of Patent: May 12, 1998

[54] BELT FORCE LIMITER FOR A VEHICLE SEAT BELT

[75] Inventors: Heinz Knoll, Stuttgart; Wolfgang Fischer, Leinfelden-Echterdingen, both of Germany

[73] Assignee: Mercedes-Benz AG, Stuttgart, Germany

[21] Appl. No.: 825,157

[22] Filed: Mar. 26, 1997

[30] Foreign Application Priority Data

Apr. 15, 1996 [DE] Germany .................. 196 14 730.1

[51] Int. Cl.[6] ............................................... B60R 22/28
[52] U.S. Cl. .................. 280/805; 280/808; 297/470; 297/471
[58] Field of Search ............................ 280/805, 808, 280/801.1; 297/470, 471, 472, 483, 486

[56] References Cited

U.S. PATENT DOCUMENTS

| | | | |
|---|---|---|---|
| 3,838,870 | 10/1974 | Hug | 280/805 X |
| 3,889,969 | 6/1975 | Otani | 280/805 |
| 4,886,296 | 12/1989 | Brodmann | 280/805 |
| 4,948,199 | 8/1990 | Weller | 297/412 |
| 5,340,046 | 8/1994 | Schroth et al. | 280/805 X |
| 5,464,252 | 11/1995 | Kanazawa et al. | 280/805 |

FOREIGN PATENT DOCUMENTS

| | | |
|---|---|---|
| 0 404 075 A2 | 12/1990 | European Pat. Off. |
| 1 506 097 | 6/1969 | Germany |
| 2157899 | 6/1973 | Germany ............ 280/805 |

*Primary Examiner*—Christopher P. Ellis
*Attorney, Agent, or Firm*—Evenson, McKeown, Edwards & Lenahan, P.L.L.C.

[57] ABSTRACT

A belt force limiter for a vehicle seat belt is mounted fixed to the vehicle by one end and, at its opposite free end, secures the shoulder strap approximately at shoulder level. The shoulder strap is displaced forward in relation to the vehicle seat with a limited amount of travel by the belt force limiter when tensile loading occurs due to a crash, tensile energy being absorbed in the belt force limiter. The belt force limiter has a pivot lever which is linked to an energy-absorbing component and in the position of rest is aligned approximately vertically and whose free end can be pivoted forward by the tension on the shoulder strap in the event of a crash, as a result of which the energy-absorbing component is deformed in an energy-absorbing manner.

13 Claims, 1 Drawing Sheet

BELT FORCE LIMITER FOR A VEHICLE SEAT BELT

BACKGROUND AND SUMMARY OF THE INVENTION

The invention relates to a belt force limiter for a vehicle seat belt.

This application claims the priority of German Patent application 196 14 730.1 filed in Germany on Apr. 15, 1996, the disclosure of which is expressly incorporated by reference herein.

U.S. Pat. No. 3,889,969 discloses a belt force limiter for a vehicle seat belt by means of which one end of the seat belt is secured in the vehicle at shoulder level. This belt force limiter comprises a gas and liquid-filled piston/cylinder unit, both media being separated from one another by the piston, and the piston being locked by means of a locking pin. In the event of severe tensile stressing, the locking pin shatters and the piston in the cylinder is displaced, as a result of which fluid is forced through piston-side holes into the gas-filled cylinder space. As a result, the effective length of the seat belt with respect to the vehicle seat is extended forward in the direction of travel, and piston travel-dependent damping of the tensile stressing is brought about. With the necessity of a large number of components, this belt force limiter is of complex design and thus expensive. Furthermore, owing to the extendable piston rod, it requires a large amount of space for installation and movement.

German Patent document DE 1 506 097 B1 describes a belt retractor which is mounted on a pivot lever on the floor of the vehicle, it being possible to pivot the pivot lever counter to a spring force into different positions, in order to adapt the position of the belt retractor to the setting of the seat. In the position of use of the belt retractor, the spring is already stressed. In the event of a crash, the seat belt which is stressed with a high degree of tension aligns the pivot lever in the direction of the resulting force in the belt retractor, as a result of which the spring, which is also not provided or designed for this, cannot contribute to the conversion of energy of the tensile forces in the seat belt. Extension of the effective length of the seat belt with respect to the vehicle seat and the associated relieving of the vehicle occupant of pressure does not take place here. U.S. Pat. No. 4,948,199, U.S. Pat. No. 4,886,296 and EP 0 404 075 A2 relate to general background regarding seat belts whose effective length can be modified by tensile force by belt force limiters which absorb energy in the process.

An object of the present invention is to provide a belt force limiter which is of simple design and yet effective.

This and other objects have been achieved according to the present invention by providing a belt force limiter for a vehicle seat belt, comprising a pivot lever which is aligned approximately vertically in a rest position, a first end of said pivot lever being connected to a vehicle-fixed structure via an energy-absorbing component, a shoulder strap of the vehicle seat belt being secured to said pivot lever proximate a free end of the pivot lever located opposite said first end, said free end of the pivot lever being pivotable about said first end to allow a limited forward displacement of said shoulder strap with respect to said vehicle-fixed structure due to a tensile load on said shoulder strap, said energy-absorbing component absorbing energy of said tensile load.

The pivot lever of the belt force limiter is pivoted forward in the event of a crash by the high level of tension on the belt due to stress. The pivot lever displaces the shoulder strap forward in relation to the seat, as a result of which a controlled forward displacement of the vehicle occupant also occurs. At this time, the belt force limiter reduces the loading of the vehicle occupant by the shoulder strap and absorbs energy via the associated, energy-converting component, to such a degree that the remaining loading is tolerable for the person wearing the belt.

The force profile over the pivoting path and the forward displacement path of the vehicle occupant can be determined here by the pivoting angle, the length of the lever arm and by the design of the energy-converting component in a structurally defined characteristic curve with a precisely specified forward displacement path.

In its position of rest, the pivot lever is aligned approximately vertically and it is not pivoted forward, at most into a flush arrangement of the pivot lever and of the shoulder strap, until the strong tensile forces are exerted on the shoulder strap by the vehicle occupant in the event of a crash. In this context, a pivoting movement would be possible from above as well as from below.

The arrangement of the pivot lever can, when its free end is lowered, additionally increase the contact path of the shoulder strap against the shoulder of the vehicle occupant, i.e. the area of the shoulder which the shoulder strap encompasses is increased, as a result of which a better restraining effect for the vehicle occupant is produced.

The shoulder strap can be attached by its end to the pivot lever or else can be deflected at the pivot lever. In both cases, the shoulder strap can be displaced forward with respect to the seat. The energy-converting component provided may be a deformation element by means of which, for example, a progressive increase in tensile force over the pivoting path can be set. A torsion rod, which connects the pivot lever to the bearing point on the vehicle and is subjected to torsion when the pivot lever pivots, can be used as a deformation element which is cost-effective to produce and simple to install. The selected diameter of the torsion rod directly influences here the force which is necessary at the pivot lever for pivoting and is secured in a hole on the pivot lever and/or at the bearing point on the vehicle in an easy-to-produce positively locking connection to a polygon. An elongated pivot lever is equivalent to a long lever arm by means of which the torsion rod can be subjected to torsion with a relatively small application of force.

The pivot lever can be coupled pivotably, in a premounted form, to a securing base which is easy to use as an attachment to the bearing point on the vehicle.

The use of such a belt force limiter on each shoulder strap of a belt system which is constructed as a harness belt applies to an equally large, non-rotated forward displacement of both shoulders of the vehicle occupant.

Other objects, advantages and novel features of the present invention will become apparent from the following detailed description of the invention when considered in conjunction with the accompanying drawings.

DETAILED DESCRIPTION OF THE DRAWINGS

Figure 1:
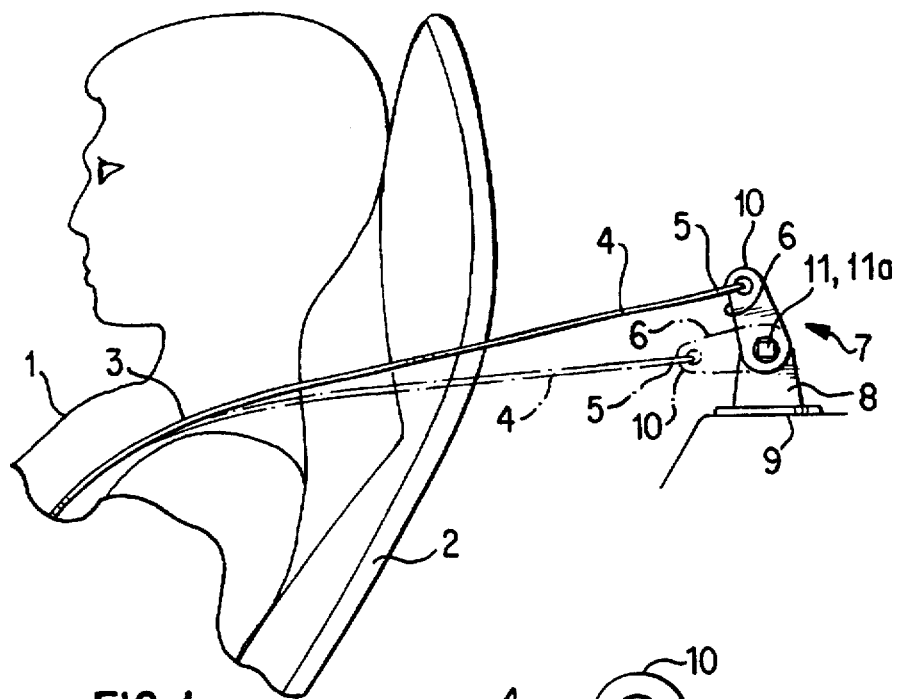
FIG. 1 shows a side view of a belt force limiter according to a preferred embodiment of the present invention at the end of a shoulder strap which restrains a vehicle occupant on a vehicle seat.

FIG. 1 shows a side view of a vehicle occupant 1 seated on a vehicle seat 2. The vehicle occupant 1 is restrained with respect to the vehicle seat 2 by a seat-belt shoulder strap 4 running over the shoulder 3 of the vehicle occupant. The end 5 of the shoulder strap is secured to a pivot lever 6 which is a component of a belt force limiter 7, as illustrated in more detail in FIG. 2.

Figure 2:
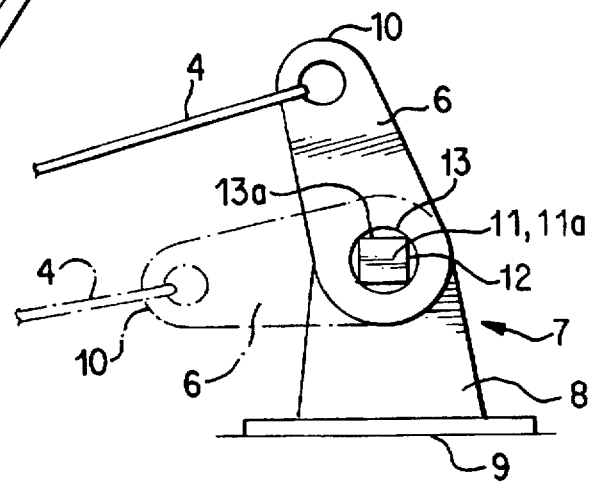
FIG. 2 shows the belt force limiter from FIG. 1 illustrated in an enlarged view, in a customary, vertical position of rest, and illustrated, by dot-dash lines, in a horizontal pivoted position due to a high level of tensile loading during a crash.

The belt force limiter 7 in FIG. 2 has a securing base 8, with which it is secured to a bearing point 9 on the vehicle, for example to a rear parcel shelf. The pivot lever 6 can be premounted on the securing base 8, as a result of which the belt force limiter 7 can be easily, even subsequently, installed. The pivot lever 6 is pivotably mounted on the securing base 8 and projects vertically from it, the shoulder strap 4 being attached to the free end 10.

Installed in the belt force limiter 7 in the pivoting axis of the pivot lever 6 is an energy-converting component 11 which keeps the pivot lever 6 in the vertical position of rest. The energy-converting component 11 does not permit the pivot lever 6 to pivot forward and downwards at most as far as a flush arrangement of the pivot lever 6 and of the shoulder strap 4 accompanied by the conversion of energy until there is a crash with a strong tensile force on the shoulder strap 4. During the pivoting movement of the pivot lever 6, the force which is exerted on the vehicle occupant 1 is therefore reduced in the energy-converting component 11 and, in addition, a forward displacement of the vehicle occupant 1 with respect to the vehicle seat 2 with a limited amount of travel is permitted, as a result of which the shoulder strap 4 exerts less force on the vehicle occupant 1.

As a result of the arrangement of the pivot lever 6, the belt is made more comfortable to wear and, when the free end 10 is lowered, the contact of the shoulder strap 4 against the shoulder 3 of the vehicle occupant, i.e. the area of the shoulder which the shoulder strap encompasses is increased. Consequently, a better restraining effect for the vehicle occupant is produced.

The force profile over the pivoting path, as well as the forward displacement path of the vehicle occupant 1, can be determined here by the permitted pivoting angle of the pivot lever 6, which angle may be limited by stops, the length of the lever arm of the pivot lever 6 and by the design of the energy-converting component 11 in a structurally defined characteristic curve with a precisely specified forward displacement path. An elongated pivot lever 6 is equivalent to a long lever arm, by means of which the energy-converting component 11 can be subjected to a low application of force by the shoulder strap 4.

The forward pivoting movement of the pivot lever 6 out of the position of rest is possible equally well from above as from below, i.e., the pivot lever 6 may extend either upward or downward from its pivot point on the securing base 8. The shoulder strap 4 can be secured by its end 5 to the pivot lever 6 or else deflected at the pivot lever 6. In both cases, the shoulder strap 4 can be displaced forward with respect to the vehicle seat 2.

Figure 3A:
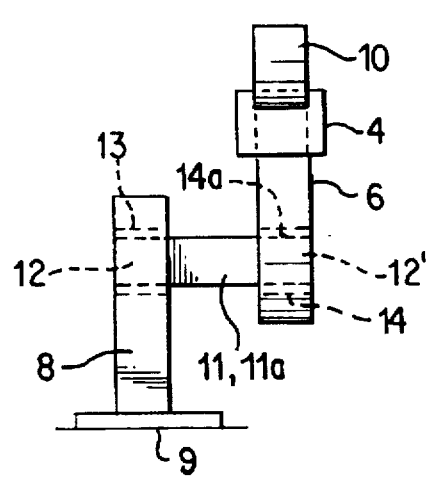
FIG. 3a shows a view from the front of the belt force limiter of FIG. 2 in a vertical position of rest.
Figure 3B:
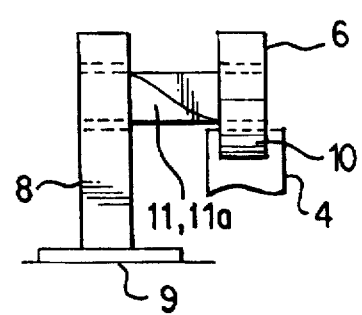
FIG. 3b shows a view from the front of the belt force limiter of FIG. 2, pivoted horizontally due to a high level of tensile loading during a crash.

As is illustrated in FIGS. 3a and 3b in a view from the front, a deformation element, for example in the form of a torsion rod 11a which freely connects the pivot lever 6 and the securing base 8 or the bearing point 9 on the vehicle to one another, may be used as the energy-converting component 11. In this context, the diameter of the torsion rod 11a directly influences the force, exerted by the shoulder strap 4, which causes the pivoting of the pivot lever 6. The torsion rod 11a is secured in a non-rotatable fashion via square end portions 12, 12' respectively seated in a hole 13 or a square hole 13a in the pivot lever 6 and a hole 14 or a square hole 14a in the securing base 8. The end portions 12, 12' of the torsion rod 11a may have any polygonal cross-section, with the holes 13a, 14a in the pivot lever 6 having a corresponding cross-section such that the torsion rod and the pivot lever are non-rotatably connected. The torsion rod 11a is subjected to torsional deformation when the free end 10 of the pivot lever 6 pivots forwards and downwards, as shown in FIG. 3b, out of the position of rest illustrated in FIG. 3a, tensile energy being converted into deformation energy. The torsion rod 11a brings about a progressive increase in tensile force over the pivoting path.

In a harness-type seat belt having a separate shoulder strap 4 extending over each shoulder 3 of the vehicle occupant 1, the use of one belt force limiter 7 on each respective shoulder strap 4 of the harness belt leads, in parallel, to an equally large, non-rotated forward displacement of both shoulders 3 of the vehicle occupant 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A belt force limiter for a vehicle seat belt, comprising a pivot lever which is aligned approximately vertically in a rest position, a first end of said pivot lever being connected to a vehicle-fixed structure via an energy-absorbing component, a shoulder strap of the vehicle seat belt being secured to said pivot lever proximate a free end of the pivot lever located opposite said first end, said free end of the pivot lever being pivotable about said first end to allow a limited forward displacement of said shoulder strap with respect to said vehicle-fixed structure due to a tensile load on said shoulder strap, said energy-absorbing component absorbing energy of said tensile load.

2. A belt force limiter according to claim 1, wherein said pivot lever is arranged generally at the level of a shoulder of a vehicle occupant, and wherein said pivot lever is arranged such that a contact path between the shoulder strap and the shoulder of the vehicle occupant is increased when said free end of the pivot lever is pivoted.

3. A belt force limiter according to claim 1, wherein a pivot angle of the pivot lever is limited.

4. A belt force limiter according to claim 1, wherein the pivot lever is of elongated construction.

5. A belt force limiter according to claim 1, wherein said energy-converting component is a deformation element which is deformable to absorb the energy of the tensile load.

6. A belt force limiter according to claim 5, wherein said deformation element is configured such that it progressive absorbs more energy from said tensile load over a pivoting path of the pivot lever.

7. A belt force limiter according to claim 1, wherein the pivot lever is coupled to a securing base which is secured to the vehicle-fixed structure.

8. A belt force limiter according to claim 5, wherein the deformation element is a torsion rod which extends between the pivot lever and a securing base which is secured to the vehicle-fixed structure.

9. A belt force limiter according to claim 8, wherein at least one end portion of the torsion rod has a polygonal cross section which is secured in at least one of a hole in the pivot lever and a hole in the securing base.

10. A belt force limiter according to claim 1, wherein the shoulder strap is deflected at the pivot lever, and at least one free end of the shoulder strap is secured at a vehicle body end.

11. A belt force limiter according to claim 1, wherein said vehicle seat belt is a harness belt having two shoulder straps for each respective shoulder of a vehicle occupant, and wherein a separate of said belt force limiters is provided for each of said shoulder straps, such that the belt force limiters act in parallel.

12. A belt force limiter for a vehicle seat belt, comprising:
- a securing base fixedly connected to a vehicle-fixed structure;
- a deformation element fixedly connected to said securing base; and
- a pivot lever fixedly connected to said deformation element, a first end of said pivot lever being connected to said deformation element, a free end of said pivot lever being connected to a shoulder strap of the vehicle seat belt, said deformation element being deformable to allow said free end of the pivot lever to pivot about said first end to allow a limited forward displacement of said shoulder strap with respect to said vehicle-fixed structure due to a tensile load on said shoulder strap, the deformation of said deformation element absorbing energy of said tensile load.

13. A belt force limiter according to claim 12, wherein said deformation element is a torsion rod, a first longitudinal end of said torsion rod being fixedly connected to said securing base, and a second longitudinal end of said torsion rod being fixedly connected to said first end of the pivot lever.

* * * * *